United States Patent [19]

Miall

[11] Patent Number: 5,007,279
[45] Date of Patent: Apr. 16, 1991

[54] CYLINDER HEAD STRAIGHTENER

[76] Inventor: Derek L. Miall, 150 Wakefield Street, Bald Hills, Queensland 4036, Australia

[21] Appl. No.: 494,969

[22] Filed: Mar. 16, 1990

[30] Foreign Application Priority Data

Mar. 16, 1989 [AU] Australia ............................. PJ3254

[51] Int. Cl.$^5$ ............................................. B21D 41/00
[52] U.S. Cl. ................................. 72/394; 29/888.011; 29/888.06; 72/454
[58] Field of Search ...................... 29/888.011, 888.06; 72/394, 454, 412

[56] References Cited

U.S. PATENT DOCUMENTS

| | | | |
|---|---|---|---|
| 1,860,171 | 5/1932 | Bynum | 72/454 |
| 1,869,225 | 7/1932 | Sircoulomb | 72/454 |
| 2,717,020 | 9/1955 | Dobias | 72/394 |
| 4,232,437 | 11/1980 | Fair | 29/888.011 |
| 4,545,101 | 10/1985 | Hilts | 29/888.06 |

*Primary Examiner*—Irene Cuda
*Attorney, Agent, or Firm*—Renner, Otto, Boisselle & Sklar

[57] ABSTRACT

An apparatus for straightening a cylinder head of an internal combustion engine is provided. The apparatus includes a pair of elongate members on which the cylinder head is mounted. Tensionable members are adjustably anchored in the elongate members and pass through bores in the cylinder head. Tensioning means provided on each tensionable member enable desired forces to be selectively applied to the head to provide corrective deformation of the head. The apparatus is versatile and accommodates cylinder heads of most known makes of internal combustion engines.

8 Claims, 3 Drawing Sheets

CYLINDER HEAD STRAIGHTENER

THIS INVENTION relates to apparatus and method for straightening cylinder heads of internal combustion engines that have become deformed or have otherwise deviated from their true design configuration. The invention is particularly suitable for aluminium heads (which term also includes aluminium alloy heads).

BACKGROUND OF THE INVENTION

In recent years, there has been a marked increase in the use of high technology engines in mass-produced automobiles. Features such as single overhead camshafts (SOHC) or double overhead camshafts (DOHC), and aluminium alloy engines, are now supplied standard on most cars. Modern manufacturing techniques have also enabled automobile engine designers to design to much closer manufacturing tolerances than had previously been attainable, and this has led to much improved mechanical efficiencies within the engine, and much lighter engine assemblies.

Unfortunately, engine repair and rebuilding techniques have not kept pace with this new technology. Procedures and tools which worked adequately on older engines having tolerances in the order to ±0.25 mm (±0.010 inches) are not normally capable of producing tolerances in the order of ±0.05 mm (±0.002 inches) as required by modern SOHC and DOHC engines.

These changes have been particularly noticeable in the design and repair of cylinder heads. In older engines, the camshaft that operates the inlet and exhaust valves is usually located deep within the motor, adjacent to the crankshaft, and the valves are actuated by long pushrods operating off the cams of the camshaft, or by hydraulic means. The cylinder head of these motors merely acts as a seal for the cylinders, and a mounting base on which to mount the valves and valve rockers, and any free-play between the valves, valve rockers and pushrods can normally be eliminated by using shims, or adjustable screws. As mentioned above, a manufacturing tolerance of the order of ±0.25 mm is sufficient for the flat mounting surface of the cylinder head where it is mounted onto the engine block. A good gasket can normally ensure that the cylinder head seals the cylinders properly, even if the head has a small degree of twist (or warp), or is bowed, within this ±0.25 mm tolerance.

The procedures and tools commonly used to straighten an aluminium (alloy) cylinder head of this type are somewhat simple. First, a number of holes are drilled and tapped into a piece of flat steel plate to suit the mounting bolt holes of the particular cylinder head to be straightened. The head is measured while it is cold and the location and amount of distortion are calculated. The head is then placed on the steel plate and shims are placed between the head and steel plate at the contact points. Bolts are passed through the mounting holes in the head, screwed into the steel plate, and tightened to a torque that has been estimated empirically to give the required head straightness. The whole assembly is put in an oven to anneal for a period of 2-4 hours. After this time, it is removed from the oven, the bolts are loosened, and the head is checked to ascertain whether it has straightened sufficiently so as to be usable. If the head is still not straight enough, the whole procedure is repeated until the desired degree of straightness is achieved. Hence, this trial-and-error procedure is greatly dependent upon the skill and knowledge of the tradesman doing the job. However, with the wide tolerance allowable on the flat head mounting surface of most old cylinder heads, the head is usually "straight" after one annealing process.

With overhead cam (OHC) engines on the other hand, the camshaft is journalled in a series of bearings on the aluminium (alloy) cylinder head, and the valves are operated directly by cams on the camshaft. Little or no adjustment is available with this arrangement, so manufacturing tolerances are much stricter than the earlier arrangements described above. The most critical manufacturing tolerance in OHC arrangements is in the alignment of the support bearings for the camshaft. The (four or five) bearings supporting the camshaft must all be aligned so that their rotational centrelines are concentric to within ±0.05 mm as stated earlier. With this tolerance in mind, it can be readily appreciated that the abovementioned prior art procedure for straightening cylinder heads is not suited to straightening OHC heads as it does not allow for accurate control or measurement of the amount of straightening. Indeed, an OHC head often requires several heat treatments to achieve the desired degree of straightness. This is both time consuming and expensive, and in most cases, it is more economical to replace a deformed cylinder head rather than attempt to straighten it.

Further, it is usually necessary to drill and tap new holes in the steel plate for different makes of cylinder heads.

SUMMARY OF THE INVENTION

It is an object of the invention to provide an apparatus for straightening aluminium cylinder heads, that will overcome or substantially alleviate the problems outlined above.

A further object of the invention is to provide an apparatus for straightening aluminium cylinder heads, that will enable cylinder heads to be straightened to within ±0.05 mm of true flat, reliably and repeatably.

In one broad form, the present invention provides an apparatus for straightening a cylinder head of an internal combustion engine, said apparatus comprising:

a pair of elongate members adjustably spaced from each other and on which said head is operatively mounted, each elongate member having a slot extending longitudinally along its upper side;

at least two tensionable members, each having (1) a retaining member at one end thereof which is captively received in an associated slot yet adjustable in position along said slot, (2) a shank portion which in use is located in a respective bore through the head, and (3) adjustable tensioning means at the other end thereof for applying a force to said head;

whereby said head can be straightened by selective application of forces thereto by said tensionable members at predetermined locations.

Preferably, the apparatus also includes at least one support member which in use is positioned between the elongate members and the cylinder head to provide a fulcrum about which the head can be bent.

Preferably, each elongate member comprises a pair of spaced parallel rails which are mounted on a support member, typically a length of RHS steel. The space between and under the rails forms a slot which extends longitudinally along the top side of each elongate member.

Each tensionable member preferably comprises a length of steel rod threaded at both ends. The rod is dimensioned so that it can be passed through a bore in the cylinder head, which typically is a bolt hole in the head. A retaining member is provided at one end of each tensionable member and, in the preferred embodiment, each retaining member is a nut of inverted T-shaped cross-section which is captively received in an associated slot in an elongate member. The bottom end of each steel rod can be threaded into its respective nut while it is captively held in its slot.

The other end of each steel rod protrudes above the cylinder head and is provided with adjustable tensioning means which, in the preferred embodiment, comprises a sleeve, a thrust bearing thereon and a tensioning nut whereby on tightening the nut, the steel rod is tensioned and the sleeve applies a localised force to the cylinder head. Advantageously, a thrust washer is located between the sleeve and the cylinder head to avoid damage to the aluminium head around the bolt hole.

The steel tensioning rods are located in selected bolt holes according to the particular form of bending which is required to straighten the cylinder head. The support member(s) can be located between the elongate members and the cylinder head to provide fulcrums about which the head can be bent, and hence localised bending.

It will be apparent to those skilled in the art that since the elongate members of the invention are adjustably spaced from one another, and as the retaining members are adjustable in position along the elongate members, the apparatus is suitable for all types of heads and the tensionable members can be positioned anywhere in the plane of operation (within the dimensional scope of the apparatus).

Preferably, at least one of the elongate members is of adjustable orientation so that its upper surface can be tilted to accommodate tensioning rods in bolt holes which are not at 90° to the base of the head.

The ability to position the tensionable members at variable locations not only renders the apparatus suitable for nearly all types of aluminium cylinder heads, but also allows bending forces to be applied selectively at predetermined locations to induce a desired straightening of the cylinder head. This enables the cylinder head to be straightened within strict tolerances.

In use, the cylinder head to be straightened is placed on the elongate members, and the tensionable members are placed through preselected bolt holes in the cylinder head. The positioning of the tensionable members is determined beforehand from an analysis of the deformation of the head. Support member(s) can be interposed between the elongate members and the cylinder head to facilitate the required degree of bending at the desired location. The bottom ends of the tensionable members are threaded into respective retaining nuts which are captively received in the slots in the elongate members, and the upper end of each tensionable member which protrudes above the cylinder head is fitted with an adjustable tensioning means for that member.

The cylinder head is heated to a temperature approaching its annealing temperature, and the adjustable tensioning means are tensioned while the head is still hot so that the forces applied to the head thereby induce sufficient bending stress to cause it to yield. (It has been found that aluminium heads will have an adequate degree of plasticity slightly below the annealing temperature and it is not actually necessary to reach the annealing temperature). The bending force applied by each tensionable member is adjusted individually to achieve the desired degree of straightness of the head. The tension on each tensionable member is then slackened or released, and the straightness is checked. If the head is not straight, the tensionable members are again tensioned to bend the head to the desired degree of straightness. The procedure is repeated as necessary (typically 2 or 3 times) until the head is straight. The cylinder head is then allowed to cool.

Preferably, both elongate members are slidably mounted transversely on a pair of parallel rails. The mounting is such that not only can the spacing between the elongate members be varied, but also at least one of the elongate members can be tilted about its longitudinal axis to vary the angle between the top faces of the two elongate members.

The invention can also be used to straighten cylinder heads which have warped or bent about a vertical axis. The cylinder heads are turned 90° before being placed on their elongate members, and a similar corrective deformation procedure is used.

BRIEF DESCRIPTION OF THE DRAWINGS

To better illustrate the invention, a preferred embodiment thereof will now be described by way of example, with reference to the accompanying drawings, wherein.

DETAILED DESCRIPTION

Figure 1:
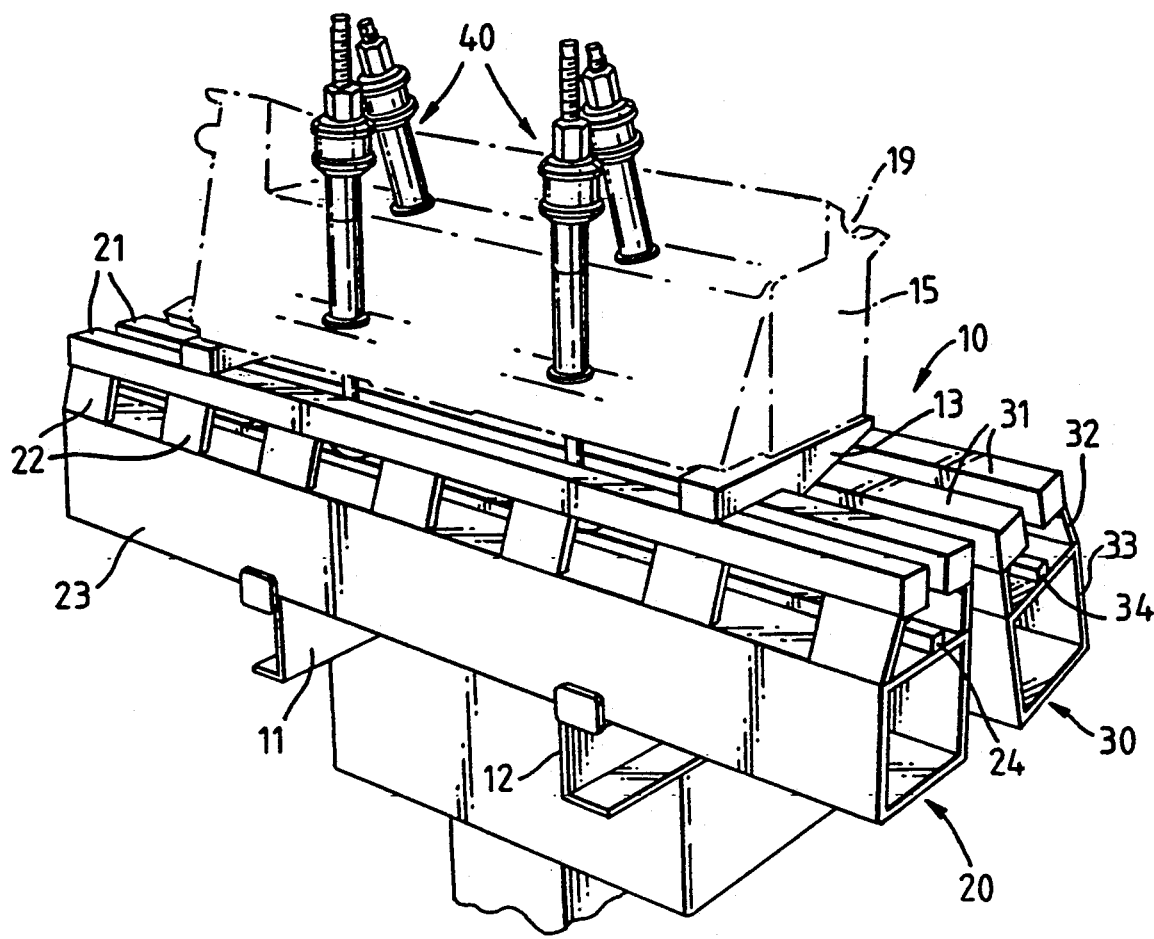
FIG. 1 is a perspective view of the preferred embodiment in a first application.

As shown in FIG. 1, the apparatus of the preferred embodiment (indicated generally at 10) comprises a pair of elongate members 20, 30 each of which is formed by a pair of parallel rails 21, 31 mounted on and above respective square section steel tubes (RHS sections) 23, 33 by means of webs 22, 32. The rails in each pair of rails 21, 31 are spaced such that respective slots are formed by the space between and under the rails 21, 31. The webs 22 are spaced from each other to allow finger access to the space beneath the rails.

Both elongate members 20, 30 are slidably mounted on a pair of parallel rails 11, 12. The rails 11, 12 are, in turn, mounted on a suitable stand so that the apparatus 10 is approximately at waist height for ease of operation.

Figure 2:
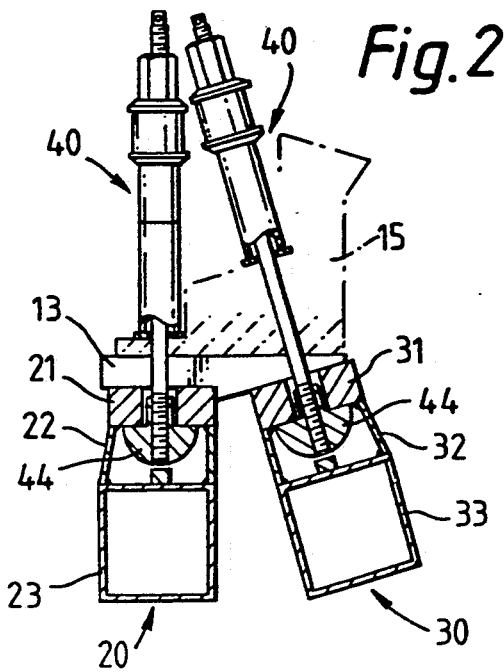
FIG. 2 is a cross-sectional view the preferred embodiment of FIG. 1.

At least one of the elongate members 20, 30 is mounted on the rails 11, 12 so that it may be tilted about its longitudinal axis to vary the orientation of its top face. As shown in FIGS. 1 and 2, the elongate member 30 has been tilted to accommodate a cylinder head 15 with angled boltholes, i.e. boltholes not at 90° to the base of the head. To accommodate such a cylinder head, support members 13 having oblique faces are interposed between the cylinder head 15 and the top rails 21, 31 of the elongate members 20, 30. However, for most cylinder heads, the elongate members 20, 30 need not be tilted and a flat support member 14 having parallel faces can be used, as shown in FIG. 3.

Figure 3:
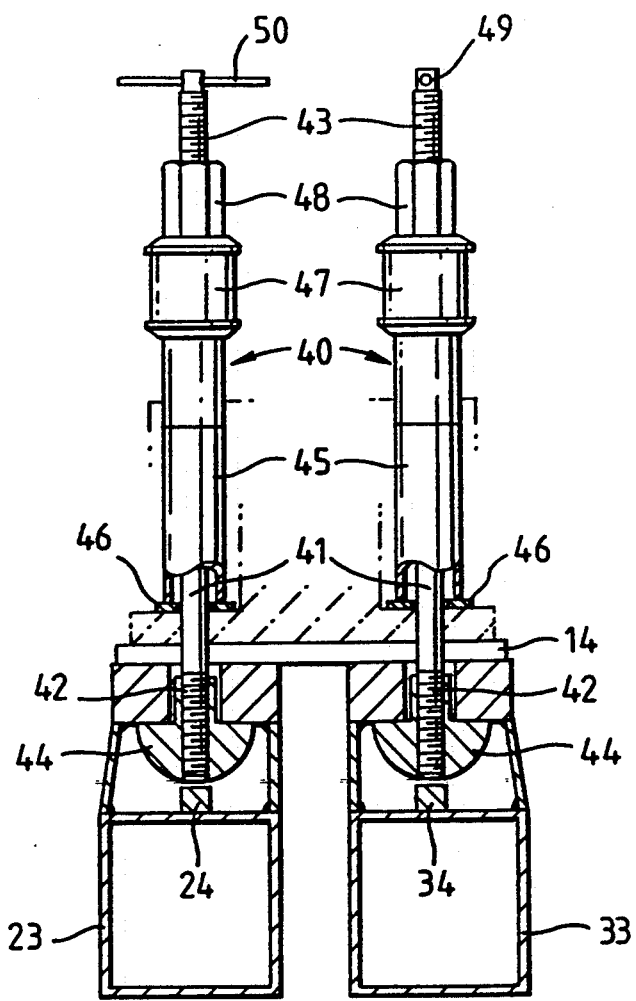
FIG. 3 is a cross-sectional view of the preferred embodiment in a second application.

The apparatus 10 of the preferred embodiment also comprises a number of tensionable members 40 which are shown in more detail in FIGS. 2 and 3. Each tensionable member 40 comprises a steel rod 41 having threaded ends 42, 43. In use, the lower end 42 of the steel rod is threaded into a retaining member which is captively received within the slot formed by the space between and below the rails 21 or 31. In the preferred embodiment, the retaining member is a nut 44 of inverted T-shape, as can be seen more clearly in FIGS. 2 and 3.

Although the nut 44 is captively retained within the slot, it is free to slide along the length of its respective elongate member 20, 30. The nut 44 can be inserted into the slot at either of the open ends of the slot. To maintain the nut 44 in a raised position against the underside of the rails 21 or 31, a ridge or rib 24, 34 is provided on top of the RHS sections 23, 33, respectively. To facilitate the threading of bottom end 42 of the steel rod 41 into the nut 44, a transverse bore 49 is provided at the top of each steel rod 41 for receiving a cross bar 50. The steel rod can then be threaded into the retaining nut 44 simply by rotating the bar 50.

Each steel rod 41 is located in a preselected respective bolt hole in the cylinder head 15. A slidable sleeve 45 is then placed around the steel rod 41 on the cylinder head and a thrust bearing 47 is placed on top of the sleeve. A tensioning member, such as a nut 48, is then threaded onto the top end 43 of the steel rod 41. It will be apparent that as the nut 48 is tightened, the reaction of the retaining nut 44 will cause the steel rod 41 to be tensioned, thereby causing the sleeve 45 to apply a force to the cylinder head around the bolt hole. To prevent damage to the aluminium cylinder head by the sleeve 45, a thrust washer 46 is interposed between the sleeve 45 and the cylinder head 15. The provision of the thrust bearing removes torsional stress and ensure that only an axial force is applied to the cylinder head by each tensionable member 40. The sleeve 45 may be formed in a number of parts to accommodate cylinder heads of different heights.

A method of straightening a cylinder head using the above described apparatus will now be described. First, the cylinder head is measured to determine the nature and location of the deformation. If, for example, the head is bowed upwardly in the middle, it is mounted at its ends on support members which are placed on the elongate members 20, 30. Alternatively, if one end is bowed upwardly, the head may be supported on support members located at its centre and at the other end. If the head 15 has angled bolt holes which are not perpendicular to its base, wedge-shaped support members 13 are used as shown in FIGS. 1 and 2. However, in most cases, the bolt holes will be normal to the base of the cylinder head and flat bars 14 can be used as supports as shown in FIG. 3. The bolt holes through which the tensionable members 40 are to be inserted are then selected, and the position and orientation of the elongate members 20, 30 are adjusted so that the centrelines of the selected bolt holes pass through the centre of the slots between the rails 21, 31 of the elongate members 20, 30. The positions of the support blocks 13 or 14 are adjusted to provide the desired fulcrum(s) or bending point(s) of the head.

The retaining nuts 44 are then inserted into the slots between the rails 21, 31 and are slid into position below respective selected bolt holes. The position of the retaining nuts 44 can be adjusted manually through the spaces between webs 22, 32. The nuts are kept in an elevated position adjacent to the underside of the rails 21, 31 by the respective ridges or ribs 24, 34. The threaded steel rods 41 of the tensionable members 40 are then inserted through the selected bolt holes and threaded into the retaining nuts 44 using cross bars 50. The thrust washers 46 are then placed over the rods and located on the counterbore for each bolt hole. Composite sleeves 45 (if required) are also placed over the rods onto the thrust washers 46, and a thrust bearing 47 is then placed on top of the sleeves 45. (The thrust bearing 47 may be provided with washers on either side thereof). Finally, a tightening nut 48 is threaded onto the upper end 43 of each steel rod 41 and tightened to finger tight.

The cylinder head 15 is then heated, for example with a gas torch or the like, to a temperature approaching the annealing temperature of the cylinder head aluminium alloy. (The annealing temperature is typically in the order of 450° C.–500° C. and the head is heated to about 420° C.). The temperature can be checked by marking a line on the cylinder head with a heat stick, or similar, commonly used by boilermakers. Once the desired temperature and plasticity have been reached the tensioning nuts 48 are tightened to cause bending forces to be applied to the cylinder head, the support blocks 13 or 14 acting as fulcrum points. As the tensioning nuts 48 are tightened, localised yielding will occur in the head 15 as the induced bending stresses go beyond the yielding stress for the cylinder head alloy. The tensionable members 40 are selectively tensioned to provide the desired degree of corrective distortion to the head.

The tension is then released or slackened and the straightness of the head is measured on the machined face 19 by using a straight edge and feeler gauges. If the head is still not straight, the tensionable members 40 are again tightened to apply the extra degree of bending required, then slackened, and the head remeasured. This procedure is repeated as necessary. Usually, the head is straight within 2 or 3 measurements.

Once the desired degree of straightness has been achieved (±0.25 mm for old style cylinder heads, ±0.05 mm for OHC cylinder heads), the cylinder head is left to cool. The straightness of the head may be rechecked at this time, but in practice this is not necessary.

Using the above straightening method, a head may be straightened within 15–20 minutes, which is a significant improvement over the previously known methods which often required 2–4 hours. Also, with practice, it is possible to straighten heads to within ±0.01 mm (±0.0005 inches), a degree of accuracy which was virtually impossible to achieve with previous methods. The above described method may also be used to straighten heads that are twisted or warped.

To improve the durability of the apparatus, parts 41–47 may be fabricated from case hardened steel. Also members 20, 30 and support means 13–14 may be painted with a heat resistant paint so that repeated heating and cooling cycles experienced by these parts do not cause corrosion.

Figure 4:
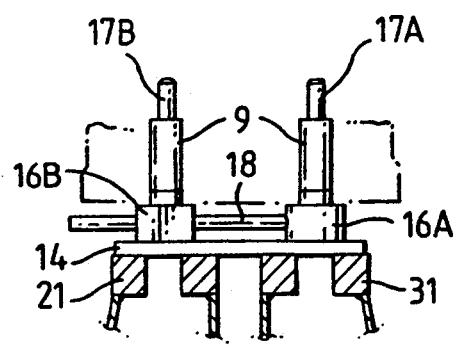
FIG. 4 is a part cross-sectional view of a head support for welding.

FIG. 4 illustrates a support for supporting heads in an inverted position while they are being welded. The support of FIG. 4 comprises a block 16A rigidly secured to a rod 18, and with spigot 17A thereon. A second block 16B is slidably mounted on rod 18 and has a suitable means for locking it in position on said rod. Spigot 17B is rigidly secured to block 16B, and both spigots 17A and 17B are orientated perpendicular to rod 18.

In use, a suitable bushing 9 is positioned on each spigot 17A and 17B and the bushings 9 are inserted into suitable holes in the top of the cylinder head. The bushings are used to reach into holes which may be below the upper surface of the head. The relative positions of blocks 16A and 16B are adjusted to suit the bolt hole spacing. Blocks 16B is then looked onto rod 18, so that the support means is held onto the head. The cylinder head 15 and support are then inverted and positioned on members 20, 30 as shown in FIG. 4 with block 14 optionally positioned between the top surface of the rails and the support.

The support is used to secure cylinder heads while they are being repaired, and to help prevent distortion of the cylinder heads as any cracks, gaps, etc. are welded-up. In addition, if a bent head is attached to the table and cracks, etc. welded-up, the heat induced in the welding process may be sufficient to enable the head to be straightened.

Figure 5:
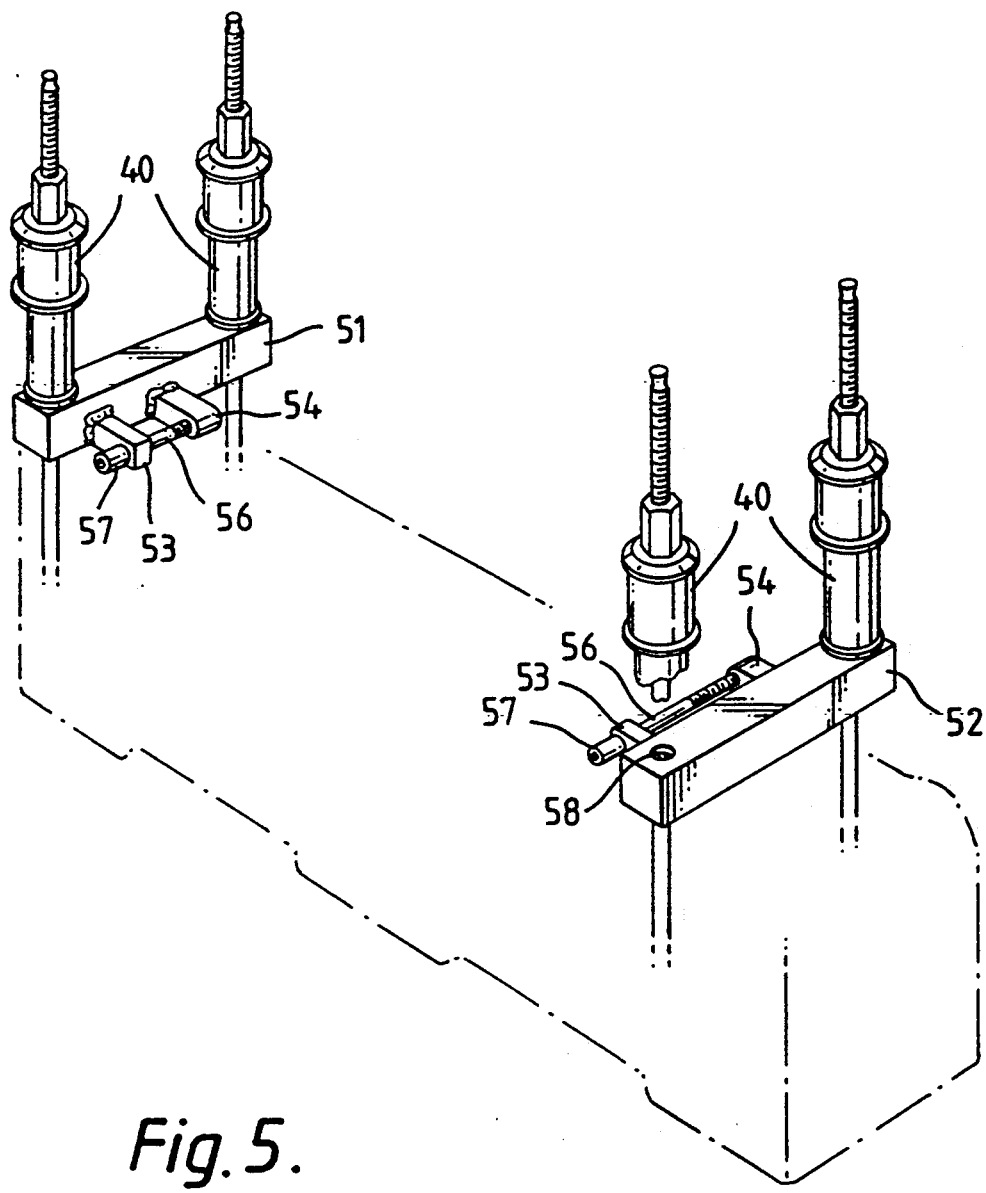
FIG. 5 is part perspective view of a further application of the invention.

This invention can also be used to straighten cylinder heads which are bent about a vertical axis, i.e. cylinder heads which have bent in the plane of the head. To straighten such a cylinder head, the cylinder head is first turned 90° onto its side before being placed on the rails 21, 31. Cross members 51, 52 are provided as shown in FIG. 5 in order to facilitate the application of corrective bending forces to the cylinder head. Each cross member 51, 52 has a pair of spaced laterally extending lugs 53, 54 thereon. A threaded bolt 56 passes through a bore in lug 53 and has a threaded end which is received in a threaded socket in the other lug 54, as can be seen in FIG. 5. Each bolt 56 has an enlarged head 57 which is able to pass through the bore in lug 53.

In use, the cross members 51, 52 are placed on the uppermost side of a cylinder head which has been turned 90° and mounted on the rails 21, 31. The cross members 51, 52 are positioned so that suitable portions of the uppermost side of the cylinder head having a through hole are located between the lugs 53, 54. The illustrated cross members have different spacings between their lugs to accommodate different sized portions of the cylinder head therebetween. The bolts 57 are then inserted through the lugs 53 and the through holes in the portions located between the lugs, and threaded into the lugs 54. In this manner, the enlarged heads 57 of the bolts 56 will clamp those portions of the cylinder head against the lugs 54. This ensures that the cross members 51, 52 are securely fixed to the cylinder head.

Tensionable members 40 (as described before) are then inserted through bores 58 at the ends of the cross members 51, 52 so that the desired corrective forces can be applied to the cross members 51, 52 and hence to the cylinder head upon which they abut. As the cylinder head is on its side, the tensionable members 40 do not pass through bolt holes in the cylinder head, but rather are located on either side of the cylinder head.

The foregoing describes only one embodiment of the invention, and modifications which are obvious to those skilled in the art may be made thereto without departing from the scope of the invention as defined in the following claims.

The claims defining the invention are as follows:

1. Apparatus for straightening a cylinder head of an internal combustion engine, said apparatus comprising:

a pair of elongate members adjustably spaced from each other and on which said head is mounted in use, each elongate member having a slot extending longitudinally along its upper side;

at least two tensionable members, each having (i) a retaining member at one end thereof which is captively received in the slot of an associated elongate member yet is adjustable in position along said slot, (ii) a shank portion which in use is located in a respective bore through the head, and (iii) adjustable tensioning means at the other end thereof for applying a force to said head;

whereby said head can be straightened by selected application of forces thereto by said tensionable members at predetermined locations.

2. Apparatus as claimed in claim 1 further comprising at least one support member which in use is positioned between the elongate members and the cylinder head to provide a fulcrum about which the head can be bent.

3. Apparatus as claimed in claim 1 wherein each elongate member comprises a pair of spaced parallel rails mounted in an elevated position on a support member, the space between and under the rails forming the slot for captively receiving the retaining member of a tensionable member.

4. Apparatus as claimed in claim 1 wherein each adjustable tensioning means comprises a sleeve around the respective tensionable member, a thrust bearing thereon, and a tensioning nut threaded on the tensionable member, whereby on tightening the nut, the tensionable member is tensioned and the sleeve applies a localised force to the cylinder head.

5. Apparatus as claimed in claim 4, further comprising a thrust washer located between the sleeve and the cylinder head in use.

6. Apparatus as claimed in claim 3 wherein the elongate members are adjustably mounted transversely on a pair of rail members.

7. Apparatus as claimed in claim 3 wherein at least one of the elongate members is of adjustable orientation so that its upper surface can be tilted to accommodate tensioning rods in bolt holes which are not at 90° to the base of the head.

8. Apparatus for straightening a cylinder head of an internal combustion engine, said apparatus comprising:

a pair of elongate members adjustably spaced from each other and on which said head is mounted in use at 90° to its normal orientation, each elongate member having a slot extending longitudinally along its upper side;

a pair of cross members adapted to be placed transversely across the cylinder head in use, each cross member having clamping means for securing it to the cylinder head;

at least two pairs of tensionable members, each having (i) a retaining member at one end thereof which is captively received in the slot of an associated elongate member yet is adjustable in position along said slot, (ii) a shank portion which in use passes through a respective bore in a cross member, and (iii) adjustable tensioning means at the other end thereof for applying a force to an associated one of the cross members;

whereby said head can be straightened by selected application of forces to the cross members by said tensionable members.

* * * * *